Jan. 5, 1960 J. D. SELLERS ET AL 2,920,147

ANNOUNCING SYSTEM

Filed March 19, 1956 2 Sheets-Sheet 1

INVENTORS
Jack D. Sellers
Richard J. Matt
BY
Harness, Dickey & Pierce
ATTORNEYS

INVENTORS.
Jack D. Sellers
Richard J. Matt.
BY
Harness, Dickey & Pierce
ATTORNEYS.

United States Patent Office 2,920,147

Patented Jan. 5, 1960

2,920,147

ANNOUNCING SYSTEM

Jack D. Sellers and Richard J. Matt, Detroit, Mich.

Application March 19, 1956, Serial No. 572,574

13 Claims. (Cl. 179—100.2)

This invention relates to announcing systems and more particularly to arrangements for simultaneously transmitting a message or a plurality of messages over a plurality of communication paths.

The principles of the invention are representatively embodied in a magnetic recording mechanism particularly adapted for use in conjunction with telephonic connecting and switching equipment to transmit a prerecorded message in response to the receipt of an initiating signal.

The telephone answering devices presently available for use with telephone equipment comprise a magnetizable material movable relative to a single playback magnetic head coupled with a control mechanism responsive to ringing tone on the subscriber's line to cause a prerecorded message to be transmitted to the calling party. Since each such device must be individual to a subscriber's line, but one message can be transmitted at any one time.

If a subscriber desires to transmit prerecorded messages in volume, for business, advertising or information purposes, it is necessary at the present time that he lease a number of lines appropriate to that volume and associate an announcing system of the noted nature with each of those lines.

An object of this invention is to reduce the cost of a multiple announcing system installation primarily by reducing unnecessary duplication of operating elements.

Another object of this invention is to improve the operation of announcing system equipments.

A feature of this invention is a magnetic announcing machine including a magnetizable medium and a plurality of playback heads any one of which can reproduce a recorded message independently of any other one of those heads.

Another feature of this invention is a magnetic announcing machine for transmitting different portions of a prerecorded message over different ones of a plurality of communication paths at any one instant.

Another feature of this invention is a magnetic announcing machine for concurrently transmitting each of a plurality of prerecorded messages over each of a plurality of communication paths.

Another feature of this invention is a magnetic announcing machine in which means are provided for automatically cleaning the playback head at each use thereof.

The manner of accomplishing the foregoing objects, the detailed nature of the foregoing features, and other objects and features of the invention, will be perceived from the following detailed description of an embodiment of the invention when read with reference to the accompanying drawings in which.

Figure 1:
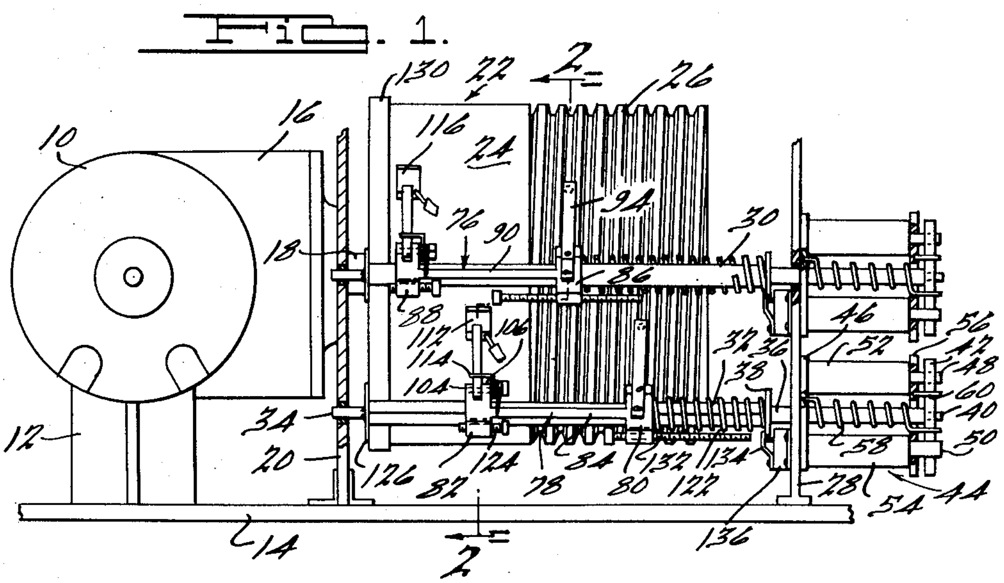
Figure 1 is a fragmentary side elevational view of a magnetic announcing machine embodying certain of the principles of the present invention.
Figure 2:
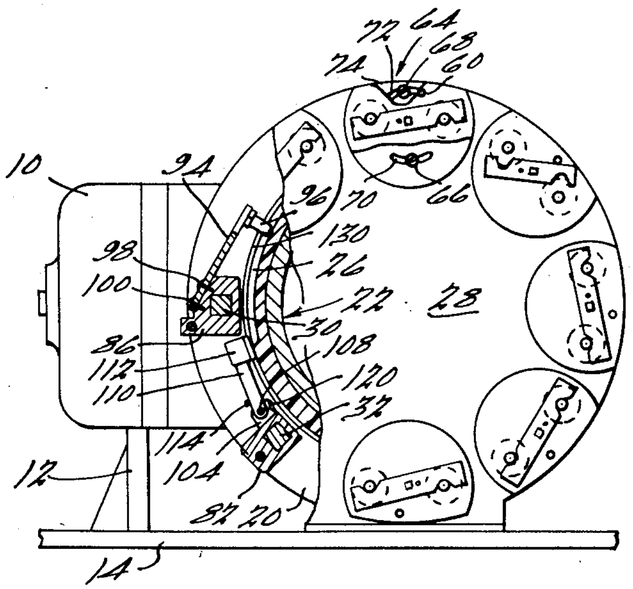
Fig. 2 is an end elevational view of the structure of Fig. 1, with certain of the elements being cut away, substantially along the line 2—2 of Fig. 1, to show certain of the details of the construction more clearly.

Referring first to Figs. 1 and 2 of the drawings, a motor 10, supported by a pedestal 12 on a base 14, is connected to drive a speed reducing mechanism 16. The output shaft 18 of speed reducer 16 passes through an aperture in an end plate 20 rigidly supported upon the base 14. A drum 22, representatively tubular but having a solid end, is secured to and supported upon the output shaft 18. As a result of this construction, drum 22 is rotated at an appropriate speed whenever motor 10 is energized.

The surface of drum 22 is divided into two major portions: a recording surface portion 24 and a lead screw portion 26. Recording surface portion 24 is either directly coated with a magnetizable medium or is provided with a sleeve bearing a magnetizable medium in the manner well known in the art. In the representative showing, it is assumed that reproduction is achieved by establishing relative movement between the magnetic medium on the surface 24 and a magnetic head, with that head being in physical engagement with the medium. The lead screw portion 26 of the drum 22 is cut to define a helical cam which is adapted to move the magnetic heads longitudinally of the drum in a manner hereinafter to be described.

An end plate 28 is disposed in spaced parallelism with the end plate 20, those end plates being spaced a distance apart greater than the length of the drum 22. End plates 20 and 28 rotatably support a plurality of guide bars, such as guide bars 30 and 32, each of which is parallel with the axis of rotation of drum 22 and spaced radially from the surface of that drum. As may best be seen in Fig. 2 of the drawings, the several guide bars are representatively evenly spaced about the periphery of the drum 22. Each of the bars, such as bar 32, is square in cross section over the major portion of its length to perform a keying function, which may be performed in other ways as will be appreciated by those skilled in the art.

At its left-hand end, support bar 32, representative of all of the support bars, is provided with an end extension 34 having a circular cross section and engaging an aperture in end plate 20 and rotatable therein. Near its right-hand end (in the view of Fig. 1) guide bar 32 is provided with a portion 36 having a circular cross section rotatably supported in an aperture in end plate 28. A washer 38 is secured upon the portion 36 and is staked or otherwise secured in a position adjacent the major square-cross-section area portion of guide bar 32. The extreme right-hand end 40 of guide bar 32 is of reduced cross sectional area and is squared to engage a square aperture in the armature 42 of a solenoid generally designated 44. Armature 42 is secured upon end portion 40 in any suitable fashion, such as by staking.

Each of the provided plurality of rotary solenoids, such as solenoid 44, comprises a base 46 which is or may be a part of the magnetic structure, a pair of spaced-apart cores 48 and 50 carrying coils 52 and 54, respectively, and an outer plate or spool head 56 secured to the cores 48 and 50 and being formed of non-magnetic material so as not to constitute a magnetic shunt. Spool head 56 is centrally apertured to permit the guide bar 32 to pass freely therethrough. One end of a torsion spring 58, disposed around guide bar 32, is secured in the base 46 of the solenoid 44, and the other end of that spring passes through the central aperture in the outer spool head 56 and engages an aperture in the armature 42. As a result, armature 42 is spring biased in a counterclockwise direction (as viewed from that end of the structure which is represented in Fig. 2 of the drawings) against a pin 60 secured in the outer spool head 56 and serving as an armature backstop. The position of this backstop may be adjustable, if desired.

The base 46 of solenoid 44 is secured to the end plate 28, with means preferably being provided for adjusting the position of the solenoid upon that end plate. Thus, the similarly constructed and mounted solenoid 64 is partially cut away in the view of Fig. 2 to show a representative mounting arrangement comprising a pair of screws 66 and 68 threadedly engaging tapped apertures in the end plate 28 and engaging arcuate slots 70 and 72 in the base 74 of that solenoid, correlative of base 46 of solenoid 44.

It will be appreciated that each of the support bar and solenoid structures is or may be identical to each of the others.

A carriage assembly, such as carriage assemblies 76 and 78, is mounted upon each of the guide bars, such as guide bars 30 and 32, respectively. Carriage assembly 78, representative of the others, comprises a forward rider 80 and a rear rider 82 interjoined by a tie arm 84. Similarly, carriage assembly 76 comprises a forward rider 86 and a rear rider 88 interjoined by tie arm 90. Each of the forward riders, such as riders 80 and 86, is provided with a square aperture slidably engaging its associated guide bar, such as guide bar 32 or 30, respectively, the relationship between forward rider 86 and guide bar 30 being represented in section in Fig. 2 of the drawings.

Forward rider 86 supports a tracking arm 94 carrying, at its remote end, a pin 96 serving as a cam follower engageable with the helical camming surface 26 on the drum 22. As may best be seen in section in Fig. 2 and in enlarged view in Fig. 3, tracking arm 94 is secured to forward rider 86 by means of a pair of screws 98 and 100, the latter of which engages an arcuate slot in the tracking arm 94 to provide an adjustment of the angular relationship between these elements, thereby to shift the distance, along the longitudinal axis of the drum 22, between the cam follower 96 and the magnetic head, to be described, to permit aligning the magnetic head with the recorded track on the recording surface 24 of the drum 22.

Each of the rear riders, such as rear riders 82 and 88, is or may be identical to each of the others, and the construction of rear rider 82, and parts mounted thereon, will be described in view of its presentation in sectional view in Fig. 2 of the drawings. Rear rider 82 has a square central aperture slidably engageable with guide shaft 32 and is provided with a pair of spaced-apart flanges 104 and 106 mounted on the side thereof which is clockwise of the guide bar 32, as represented in Fig. 2 of the drawings. Flanges 104 and 106 support a shaft 108 upon which is pivotally mounted an arm 110 carrying a payback or pickup head 112. Head 112 may be of any appropriate type, including types presently available on the commercial market. Head 112 is spring biased into intimate engagement with the recording surface 24 of the drum 22 by means of a torsion spring 114 mounted upon an extension of shaft 106. One end of spring 114 presses against tie arm 84 and the other end of that spring bears against the outer surface of the head-supporting arm 110.

In the drawings, both head 112, individual to carriage 78, and head 116, individual to carriage 76, are shown in their operated, reproducing positions, with the cam followers on the tracking arms, such as tracking arm 94, engaging the helical cam on the portion 26 of the drum 22. These elements are in their operating position, as shown, when the solenoids with which they are associated are operated, energization of solenoid 44, for example, producing a clockwise rotation of the armature 42 thereof (as viewed from the right in Fig. 1), and a corresponding rotation of the guide bar 32 and of the carriage 78. It will be noted that the arrangement is preferably such that each magnetic head will engage the recording surface prior to the point in the rotation of the carriage at which the cam follower engages the bottom of the helical thread, so as to insure that the head will be maintained in intimate engagement with the recording surface by virtue of the force exerted by the torsion spring, such as spring 114.

When the solenoid, such as solenoid 44, is deenergized, guide bar 32 is rotated in a counterclockwise direction due to the force exerted by spring 58. The resultant rotation of carriage 78 causes the cam follower to be withdrawn from engagement with the helical cam on the surface 26 and causes the magnetic head, such as head 112, to be separated from the recording surface 24 due to the engagement of a stop 120 (Fig. 2) integral with rear rider 82, with head supporting arm 110.

Each of the carriage assemblies, such as carriage assembly 78, is slideable along its individual guide bar, such as guide bar 32. Compression spring 122 is disposed around guide bar 32 intermediate the right-hand face (Fig. 1) of the forward rider 80 and the face of washer 38, so as to exert a continuing force tending to move carriage 78 to the left. When the cam follower mounted upon forward rider 80 is withdrawn from the grooves in the helical cam surface 26, spring 122 is effective to translate the carriage assembly 78 to the left to a stop position. In the representative arrangement, this stop position is defined by the abutting of a screw 124, threadedly engaging a tapped aperture in the rear rider 82, with a stop washer 126 rigidly mounted upon portion 34 of guide bar 32. While screw 124 may be adjusted so that head 122 is stopped over the recording surface 24 on the drum 22, advantageous results accrue from the modified arrangement disclosed in which a wiping surface 130 of mohair, felt or similar soft cleaning material is mounted around the periphery of the drum 22 at the initial end thereof, with screw 124 being adjusted so that head 112 is disposed over surface 130 when carriage 78 is released and returned to the left. Upon the energization of solenoid 44, the cam follower integral with forward rider 80 is brought into engagement with the helical cam surface 26 and the head 112 is brought into engagement with the surface 130. As carriage 78 is advanced to the right due to the reaction between the cam follower and the cam surface, the face or pole pieces of the magnetic head 112 are wiped clean upon the surface 130 and then the head 112 is advanced across the recording surface 24 at a rate identical to the initial recording rate, so that the message recorded thereon results in the production of a corresponding electrical signal across the output conductors from head 112.

Carriage 78 will continue to advance to the right, compressing spring 122 in the process, until a right-hand limit position is reached. In the representative arrangement, this right-hand limit position is defined by the engagement of a screw 132, threadedly engaging a tapped aperture in the forward rider 80, with the arm 134 of a limit switch 136. As will be seen, this produces the deenergization of solenoid 44 and a consequent rotation of guide bar 32 and carriage 78 so that carriage 78 will be returned to the left under the impetus of spring 122.

Each of the other carriage assemblies are or may be identical to that described. If a single message is to be transmitted, then the starting-position adjusting screws, such as screw 124, may be set identically on the several carriage assemblies. The terminating end adjustment is preferably set in accordance with the length of the recorded message so that the carriage will be returned to the left shortly after the recorded message is complete.

Figures 3, 4:
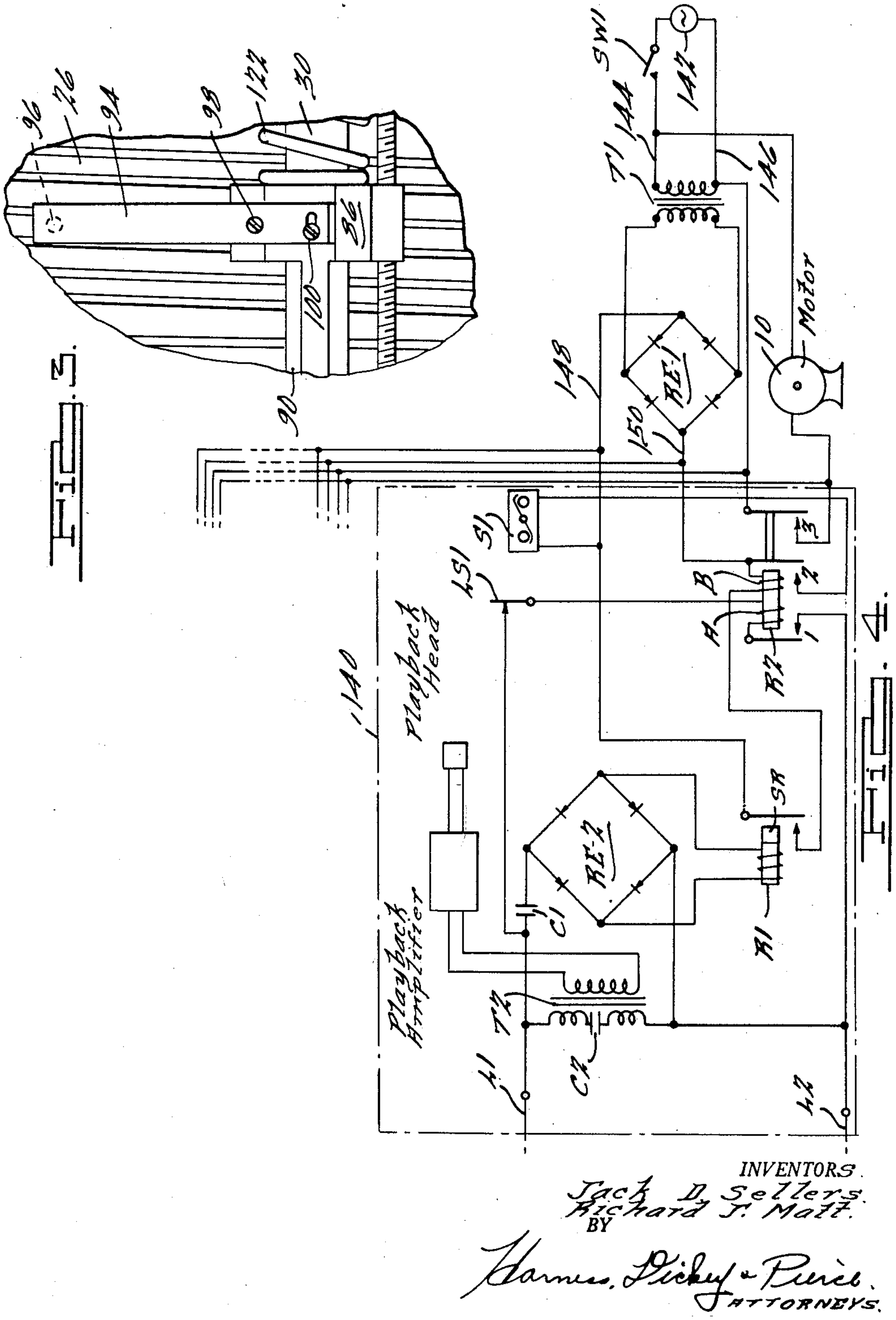
Fig. 3 is an enlarged view of a portion of the structure of Fig. 1.
Fig. 4 is a schematic representation of a control equipment suitable for association with the machine of Figs. 1 to 3.

Since each of the heads, such as heads 112 and 116, operates independently of the other heads, as will more clearly be seen from the description of the circuitry of Fig. 4, it is not imperative that each of the heads reproduce the same message. Thus, if desired, two or more shorter messages may be recorded upon the surface 24 of the drum 22, with certain of the heads, such as head 116, being adjusted to reproduce the first message and with other of the heads, such as head 112, being adjusted to reproduce a different message by appropriate adjustment of the screw 124. The terminating adjusting screws, such as screw 132, may be adjusted so that the head associated therewith is retracted at the termination of the selected one of the several messages or may be adjusted so that the head will reproduce each of a plurality of successive messages. If certain of the heads are employed to reproduce information contained only, for example, on the left-hand portion of the recording surface 24, whereas others of the heads are employed to reproduce information only on the right-hand portion of that surface, a second strip correlative to cleaning strip 130 may be mounted on the surface 24 to serve to clean those of the heads which are adjusted to operate only over the right-hand portion of the surface 24.

In addition to imparting adjustability to the backstop, such as the backstop 60 for solenoid 44, to permit adjustment of the degree of separation between the heads and the surface 24 in the released condition of the equipment, the aforesaid adjustability of the position of the solenoids themselves may be employed to adjust the engagement between the cam followers, such as cam follower 96 (Fig. 2), and the helical cam 26 on the drum 22 in the operated condition of the equipment.

Each of the playback heads, such as heads 112 and 116, is provided with an individual control apparatus representatively of the type disposed within the rectangle 140 in Fig. 4 of the drawings. All of these individual control equipments are or may be employed with certain common equipment represented outside of the rectangle in Fig. 4.

Each of the individual control equipments such as equipment 140, is individual to and connectable with a telephone line represented by conductors L1 and L2. It is assumed for purposes of description that the line L1—L2 is private, and that the ringing voltage appears thereacross.

Equipment 140 is static until such time as a ringing voltage, normally a 20 cycle-per-second alternating voltage, appears between conductors L1 and L2. This initiating signal is passed by capacitor C1, and is rectified by full wave rectifier RE–2 whereby a direct voltage appears across the winding of slow-to-release relay R1, operating that relay. The resultant closure of the contact of relay R1 completes a circuit for the operation of relay R2. Thus, the equipment is assumed to be connected to a source of line voltage 142 through a manually closed switch SW1, that voltage appearing between conductors 144 and 146 and hence across the primary winding of transformer T1. Transformer T1 has a step-down ratio so that a smaller alternating voltage is induced in the secondary winding thereof. That voltage is rectified by rectifier RE–1 and appears between conductors 148 and 150. With relay R1 operated, a circuit is completed from conductor 150, winding B of relay R2, the contacts of relay R1, to conductor 148, whereupon relay R2 operates.

The operation of relay R2 signals the central office that the equipment is ready for operation, energizes the motor of the equipment to produce rotation of the drum (or maintains that motor operated if it has already been operated by another equipment correlative of equipment 140) and energizes the solenoid individual to the particular equipment 140. Thus, upon the closure of the No. 1 contact of relay R2, a circuit is completed from line L1, through normally closed limit switch LS1 (the counterpart, for example, of limit switch 136 in Fig. 1 of the drawings), the A winding of relay R2, the No. 1 contact of relay R2 and to line L2. The establishment of this low-impedance bridge across lines L1 and L2 operates the ring-trip relay in the central office so that ringing current is removed from the line at the central office and talking battery is provided, all in the normal fashion. It will be observed that the slow-release characteristic of relay R1 results in the maintenance of a holding circuit for relay R2 during the interval between the cessation of ringing current and the establishment of talking battery so that relay R2 does not release during this interlude. After an appropriate delay following the termination of ringing current, relay R1 releases.

Upon the closure of the No. 3 contact of relay R2, the alternating voltage appearing between conductors 144 and 146 is applied across motor 10 to initiate or maintain operation of that motor and rotation of the drum 22 (Fig. 1). The closure of the No. 2 contact of relay R2 completes a circuit from the direct voltage on conductor 150, through that No. 2 contact, and through the winding of solenoid S1 to conductor 148, resulting in the operation of solenoid S1 and the clockwise movement of its armature. Solenoid S1 corresponds to any one of the solenoids represented in Figs. 1 and 2 of the drawings such as, for example, solenoid 44. As previously described, this operation of the solenoid establishes an engagement between the cam follower on the tracking arm of the carriage to which that solenoid is individual, resulting in an advancement of the magnetic head longitudinally of the drum 22 while the recording surface 24 thereof is rotating at an appropriate rate of speed. The output signal of the playback head (Fig. 4) (correlative of any one of the heads, such as head 112, shown in Figs. 1 and 2 of the drawings) is applied through a playback amplifier. The amplified signal is applied to lines L1 and L2 through transformer T2, a capacitor C2 being inserted in series with the secondary winding of that transformer to serve a direct-current blocking function. This signal is transmitted through the central office to the calling subscriber in the normal manner.

If, during the course of the message, the calling subscriber hangs up, the holding circuit for relay R2 is interrupted, that relay releases, and all circuits are restored to normal, including the termination of operation motor 10 (assuming no other one of the equipments correlative to equipment 140 to be operating) and solenoid S1 is released to restore the carriage to which equipment 140 is individual to its normal initial position. If the calling subscriber maintains the connection, the message will continue to be transmitted until it is completed. Thereafter, the adjusting screw, such as screw 132 (Fig. 1), on the forward rider, such as rider 80, will contact the individual limit switch LS1, such as limit switch 136 (Fig. 1), similarly interrupting the holding circuit for relay R2, releasing that relay and restoring all elements to normal.

The common equipment including rectifier RE–1, motor 10, and transformer T1 may be associated with all other of the equipments correlative of equipment 140, as is evidenced by the multipling of conductors 148, 150, 144 and 146. Each of the equipments, such as equipment 140, may be operated independently of all others of the equipments. The transmission of a message by any one of the playback heads may be initiated at any time independently of the then condition of any other playback head so that, for example, each of a plurality of playback heads may concurrently be transmitting over the communication path individual thereto a different portion of the same message or different portions of different messages.

The selective magnetization of the recording surface 24 to record a message is not a part of this invention and no detailed arrangement for producing that recording has been described. Obviously, that recording may be accomplished in any of a number of ways. The recording may be done at a remote location. On the other hand, any one of the heads around the periphery of the drum may be used as a recording head rather than as a playback head and have associated with it, rather than an equipment correlative of equipment 140, a microphone and a recording amplifier.

In the use of the equipment, the extent of the throw of the solenoids may merit occasional adjustment, and the setting of the initial-position and final-position screws for each movable carriage may be shifted in accordance with the nature and extent of the recorded message or messages. By virtue of the provision of the wiping strip 130, the necessity of frequent service calls to cleanse the face of the magnetic playback heads is greatly reduced.

While it will be apparent that the embodiment of the invention herein disclosed is well calculated to fulfill the objects of the invention, it will be appreciated that the invention is susceptible to modification, variation and change without departing from the proper scope or fair meaning of the subjoined claims.

What is claimed is:

1. In an announcing system, a cylindrical magnetizable surface rotatable about a longitudinal axis and having information recorded thereon, a plurality of magnetic playback heads proximate said surface, each of said heads reproducing information on said surface when moved relative to said surface, means for moving said heads longitudinally of said surface, and means for initiating movement of each of said heads longitudinally of said surface independently of the initiation of movement of any other one of said heads longitudinally of said surface.

2. In an announcing system, a cylindrical magnetizable surface and having information recorded thereon, means for rotating said surface about a longitudinal axis, a plurality of magnetic playback heads proximate said surface, each of said heads reproducing information on said surface when moved relative to said surface, means for moving each of said heads longitudinally of said surface at a rate determined by the rate of rotation of said surface, and means for initiating movement of each of said heads longitudinally of said surface independently of the initiation of movement of any other one of said heads longitudinally of said surface.

3. In an announcing system, a cylindrical magnetizable surface having a message recorded in a helical path thereon, a plurality of separate communication paths, and means including a plurality of magnetic playback heads for concurrently transmitting a plurality of different portions of said message over different ones of said paths, the portion of the message which is transmitted by any one of said heads being independent of what portion of the message is being transmitted by any other one said heads.

4. In an announcing system, a cylindrical magnetizable surface rotatable about a longitudinal axis and having information recorded thereon, a plurality of playback magnetic heads proximate said surface, each of said heads reproducing information on said surface when moved relative to said surface, and selectively actuatable means individual to each of said heads and actuatable independently of the actuation of any other one of said means and independently of the actuated or unactuated condition of any other one of said means for advancing said head longitudinally of said surface.

5. In an announcing system, a cylindrical magnetizable surface rotatable about a longitudinal axis, a plurality of magnetic heads proximate said surface, said heads being spaced from one another circumferentially about said surface, means for moving each of said heads longitudinally along said surface at a controlled rate, and means for initiating said movement of any one of said heads at a time independent of the initiation of said movement of any other one of said heads.

6. In an announcing system, a cylindrical magnetizable surface rotatable about a longitudinal axis and having information recorded thereon, a plurality of magnetic playback heads proximate said surface, each of said heads reproducing information on said surface when moved relative to said surface, selectively actuatable means individual to each of said heads for advancing said head longitudinally of said surface, and means for operating each of said selectively actuatable means independently of the others of said selectively actuatable means.

7. In an announcing system, a cylindrical magnetizable surface rotatable about a longitudinal axis, a helical cam rotatable with said surface, a plurality of magnetic heads proximate said surface, and selectively actuatable means individual to each of said heads for advancing said head longitudinally of said surface, each of said selectively actuatable means comprising a shaft, means supporting said head mounted on said shaft, a cam follower mounted on said shaft, and engageable with said helical cam when said shaft is rotated to an operating position, and electromagnetic means for rotating said shaft.

8. In an announcing system, a cylindrical magnetizable surface rotatable about a longitudinal axis, a helical cam rotatable with said surface, a plurality of magnetic heads proximate said surface, selectively actuatable means individual to each of said heads for advancing said head longitudinally of said surface, each of said selectively actuatable means comprising a shaft, means supporting said head mounted on said shaft, a cam follower mounted on said shaft and engageable with said helical cam when said shaft is rotated to an operating position, and electromagnetic means effective when operated to rotate said shaft to said operating position, means for energizing each of said electromagnets, and means effective when one of said heads has reached a preselected position along said surface for releasing the one of said electromagnets individual thereto.

9. In an announcing system, a cylindrical magnetizable surface rotatable about a longitudinal axis, a helical cam rotatable with said surface, a plurality of magnetic heads proximate said surface, selectively actuatable means individual to each of said heads for advancing said head longitudinally of said surface, each of said selectively actuatable means comprising a shaft, means supporting said head mounted on said shaft, a cam follower mounted on said shaft and engageable with said helical cam when said shaft is rotated to an operating position, and electromagnetic means effective when operated to rotate said shaft to said operating position, means for energizing each of said electromagnets, means effective when any one of said heads has reached a preselected position along said surface for releasing the one of said electromagnets individual thereto, and spring means individual to each of said heads exerting a force tending to return that head to an initial position along said surface.

10. In an announcing system, a cylindrical magnetizable surface rotatable about a longitudinal axis, a helical cam rotatable with said surface, a plurality of magnetic heads proximate said surface, and selectively actuatable means individual to each of said heads for advancing said head longitudinally of said surface, each of said selectively actuatable means comprising a shaft, means supporting said head mounted on said shaft, a cam follower mounted on said shaft and engageable with said helical cam when said shaft is rotated to an operating position, and electromagnetic means for rotating said shaft, the distance between each of said heads and the cam follower individual thereto being adjustable.

11. In an announcing system, a cylindrical magnetizable surface rotatable about a longitudinal axis and having information recorded thereon, an annulus of wiping material at one end of said surface, and a magnetic head movable longitudinally along said surface for reproducing information on said surface and positionable to engage said material during a portion of said movement.

12. In an announcing system, a cylindrical magnetizable surface rotatable about a longitudinal axis and having information recorded thereon, an annulus of wiping material at one end of said surface, a magnetic head, means positioning said head in engagement with said material, and means for moving said head longitudinally along said surface for reproducing information on said surface and from engagement with said material into engagement with said surface.

13. In an announcing system, a cylindrical magnetizable surface rotatable about a longitudinal axis, a helical cam rotatable with said surface, an annulus of wiping material near one end of said surface, a plurality of magnetic heads proximate said surface and engageable in an initial traveling position with said material, selectively actuatable means individual to each of said heads for advancing said head longitudinally relative to said surface and from engagement with said material into engagement with said surface, each of said selectively actuatable means comprising a shaft, means supporting said head mounted on said shaft, a cam follower mounted on said shaft and engageable with said helical cam when said shaft is rotated to an operating position, and electromagnetic means effective when operated to rotate said shaft to said operating position, means for energizing each of said electromagnets, means effective when any one of said heads has reached a preselected position along said surface for releasing the one of said electromagnets individual thereto, and spring means individual to each of said heads exerting a force tending to return that head to its initial position.

References Cited in the file of this patent

UNITED STATES PATENTS

| | | |
|---|---|---|
| 2,462,435 | Stanton | Feb. 22, 1949 |
| 2,468,224 | Munson | Apr. 26, 1949 |
| 2,645,494 | Keller | July 14, 1953 |
| 2,653,819 | Roberts | Sept. 29, 1953 |
| 2,674,660 | Ambrose | Apr. 6, 1954 |
| 2,741,530 | Hill | Apr. 10, 1956 |
| 2,745,904 | Bobb | May 15, 1956 |